(12) United States Patent
Otsuka

(10) Patent No.: US 8,029,056 B2
(45) Date of Patent: Oct. 4, 2011

(54) CLUTCH MECHANISM FOR VEHICLE SEAT

(75) Inventor: Taiyo Otsuka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 145 days.

(21) Appl. No.: 12/622,636

(22) Filed: Nov. 20, 2009

(65) Prior Publication Data

US 2010/0140988 A1    Jun. 10, 2010

(30) Foreign Application Priority Data

Dec. 9, 2008    (JP) ................................. 2008-313050

(51) Int. Cl.
  *B60N 2/42*    (2006.01)
  *B60N 2/427*   (2006.01)
  *B60N 2/48*    (2006.01)

(52) U.S. Cl. .................................................. 297/216.12

(58) Field of Classification Search .............. 297/216.12
See application file for complete search history.

(56) References Cited

U.S. PATENT DOCUMENTS

| 7,484,798 B2 * | 2/2009 | Yamaguchi ............... 297/216.12 |
| 7,673,938 B2 * | 3/2010 | Yamaguchi et al. ..... 297/216.12 |
| 2006/0006709 A1 * | 1/2006 | Uno et al. ................. 297/216.12 |
| 2008/0129093 A1 * | 6/2008 | Kim .......................... 297/216.12 |
| 2009/0126520 A1 | 5/2009 | Yamaguchi et al. |
| 2009/0167066 A1 * | 7/2009 | Mori et al. ................ 297/216.12 |
| 2009/0250981 A1 * | 10/2009 | Matsui ...................... 297/216.12 |
| 2009/0267389 A1 * | 10/2009 | Otsuka ...................... 297/216.12 |
| 2009/0309398 A1 * | 12/2009 | Niitsuma et al. ......... 297/216.12 |
| 2010/0007183 A1 * | 1/2010 | Akutsu ...................... 297/216.12 |
| 2010/0060048 A1 * | 3/2010 | Otsuka ...................... 297/216.12 |
| 2010/0060049 A1 * | 3/2010 | Otsuka ...................... 297/216.12 |
| 2010/0140989 A1 * | 6/2010 | Otsuka ...................... 297/216.12 |
| 2010/0148545 A1 * | 6/2010 | Omori ....................... 297/216.12 |
| 2010/0187874 A1 * | 7/2010 | Matsui ...................... 297/216.12 |
| 2010/0187875 A1 * | 7/2010 | Sasaki et al. ............. 297/216.12 |
| 2010/0270834 A1 * | 10/2010 | Niitsuma .................. 297/216.12 |
| 2010/0270835 A1 * | 10/2010 | Nitsuma .................... 297/216.12 |
| 2010/0295348 A1 * | 11/2010 | Takayasu et al. ........ 297/216.12 |
| 2011/0012401 A1 * | 1/2011 | Omori ....................... 297/216.12 |
| 2011/0018317 A1 * | 1/2011 | Omori ....................... 297/216.12 |
| 2011/0074191 A1 * | 3/2011 | Omori ....................... 297/216.12 |

FOREIGN PATENT DOCUMENTS

JP    2005-95237    4/2005

OTHER PUBLICATIONS

English language Abstract of JP 2005-95237, Apr. 14, 2005.

* cited by examiner

*Primary Examiner* — Rodney B. White
(74) *Attorney, Agent, or Firm* — Greenblum & Bernstein, P.L.C.

(57) ABSTRACT

A coupling arm presses a first or second arm of a swing member, connected to a frame of a seat back, by an occupant's backrest load caused by a rear-end collision of a vehicle to pivotally move the swing member. The swing member has a first arm receiving a first backrest load via the coupling arm and a second arm receiving a second backrest load, which is larger than the first backrest load, via the coupling arm. A distance between the first arm and a rotation center of the swing member is longer than a distance between the second and the rotation center of the swing member.

7 Claims, 8 Drawing Sheets

US 8,029,056 B2

CLUTCH MECHANISM FOR VEHICLE SEAT

INCORPORATION BY REFERENCE

The disclosure of Japanese Patent Application No. 2008-313050 filed on Dec. 9, 2008 including the specification, drawings and abstract is incorporated herein by reference in its entirety.

BACKGROUND OF THE INVENTION

1. Field of the Invention

The invention relates to a clutch mechanism for a vehicle seat and, more particularly, to a clutch mechanism for a vehicle seat, which transmits an occupant's backrest load caused by a rear-end collision of a vehicle.

2. Description of the Related Art

In an existing art, there has been known a headrest for a vehicle seat, of which a portion (support plate) that supports the back of an occupant's head instantaneously pops up toward the back of the occupant's head in the event of a rear-end collision of a vehicle. Here, Japanese Patent Application Publication No. 2005-95237 (JP-A-2005-95237) describes a technique in which the support portion pops up as described above as a load of an occupant seated on a vehicle seat strongly presses a seat back because of momentum in the event of a rear-end collision of a vehicle. In this technique, unless a rear-end collision occurs in the vehicle, an acceleration detecting mechanism installed inside the seat back does not transmit an occupant's backrest load. Therefore, even when the occupant strongly presses the seat back during normal times when no rear-end collision has been occurring in the vehicle, it is possible to prevent the support plate from erroneously popping up.

However, in the above described existing technique, when the occupant is heavy, a mere backrest load of the occupant causes a detection arm to swing by a large amount. On the other hand, when the occupant is light, a load of the occupant pressing the seat back is small even when a rear-end collision occurs in the vehicle, causing the detection arm to swing by a small amount. The support plate pops up when the detection arm swings by a certain amount or more. Therefore, depending on the degree of swing of the detection arm, the acceleration detecting mechanism may not smoothly operate even when a rear-end collision occurs in the vehicle. This may cause a malfunction in popping up of the support plate.

SUMMARY OF THE INVENTION

The invention provides a clutch mechanism for a vehicle seat, which reliably transmits an occupant's backrest load caused by a rear-end collision of a vehicle even when there is a physique difference among occupants.

A first aspect of the invention provides a clutch mechanism for a vehicle seat. The clutch mechanism includes a pressure receiving member that is pivotably connected to a frame of a seat back; a coupling arm that is pivotably connected to the pressure receiving member; and a swing member that is pivotably connected to the frame of the seat back and that is pressed by the coupling arm to pivot. The coupling arm is provided with a weight and receives an occupant's backrest load via the pressure receiving member, and the occupant's backrest load received and inertia force applied to the weight in the event of a rear-end collision of the vehicle cause the coupling arm to move in the event of a rear-end collision of a vehicle. The swing member has a first arm receiving a first backrest load via the coupling arm and a second arm receiving a second backrest load, which is larger than the first backrest load, via the coupling arm. A distance between a point at which the first arm is pressed by the coupling arm and a rotation center of the swing member is longer than a distance between a point at which the second arm is pressed by the coupling arm and the rotation center of the swing member. With the above configuration, even when an occupant is light, the coupling arm presses the first arm that is closer to the coupling arm. A distance from the first arm to the center of the swing member is longer than a distance from the second arm to the center of the swing member, so the swing member may be pivoted even when a backrest load is small. With the configuration that the coupling arm is provide with the weight, even when a light occupant is seated on the vehicle seat or even when a heavy occupant is seated on the vehicle seat, it is possible to transmit only an occupant's backrest load, caused by a rear-end collision of the vehicle, to the swing member. Therefore, even when there is a physique difference among occupants, it is possible to reliably transmit only an occupant's backrest load, caused by a rear-end collision of the vehicle, to the swing member.

In addition, in the first aspect, the coupling arm may be provided with a rod that extends toward the swing member. When the pressure receiving member pivots, the rod may press a first hook formed on the first arm or a second hook formed on the second arm to swing the swing member, whereby an occupant's backrest load may be transmitted to the swing member. This structure may further include a guide plate that has a guide hole along which the rod moves substantially downward when the pressure receiving member receives the occupant's backrest load. The guide hole may have a front end of the guide hole that is formed forward of the first hook and the second hook in side view. The rod may be urged toward the front of the vehicle seat in the guide hole, and, when inertial force is applied to the weight in the event of a rear-end collision of the vehicle, the rod may be distanced from the front end of the guide hole. A distance between the front end of the guide hole and a front end of the first hook may be larger than a thickness of the rod in a longitudinal direction of the vehicle seat, and a distance between the front end of the guide hole and a front end of the second hook may be larger than the thickness of the rod in the longitudinal direction of the vehicle seat.

With the above configuration, even when a light occupant is seated on the vehicle seat or even when a heavy occupant is seated on the vehicle seat, it is possible to transmit surely an occupant's backrest load only, caused by a rear-end collision of the vehicle, to the swing member.

In addition, the clutch mechanism for a vehicle seat according to the first aspect may further include a lock mechanism that is provided for the seat back and that is connected to the swing member via a transmitting member. The lock mechanism may be released as the swing member pivots. With the above configuration, the tension is applied to the transmitting member by a backrest load transmitted to the swing member to release the lock mechanism. That is, the pivot of the swing member is utilized to make it possible to release the lock mechanism.

Furthermore, in the above aspect, an active headrest that is assembled to the seat back and that has a support plate that pops up toward the back of a head of the occupant may be provided. The support plate may pop up toward the back of the head of the occupant as the lock mechanism is released. With the above configuration, it is possible to cause the support plate to pop up toward the back of the head of an occupant by an occupant's backrest load caused by a rear-end collision of the vehicle. Thus, as a rear-end collision occurs in the vehicle, it is possible to instantaneously receive the back of the head of the occupant by the support plate.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
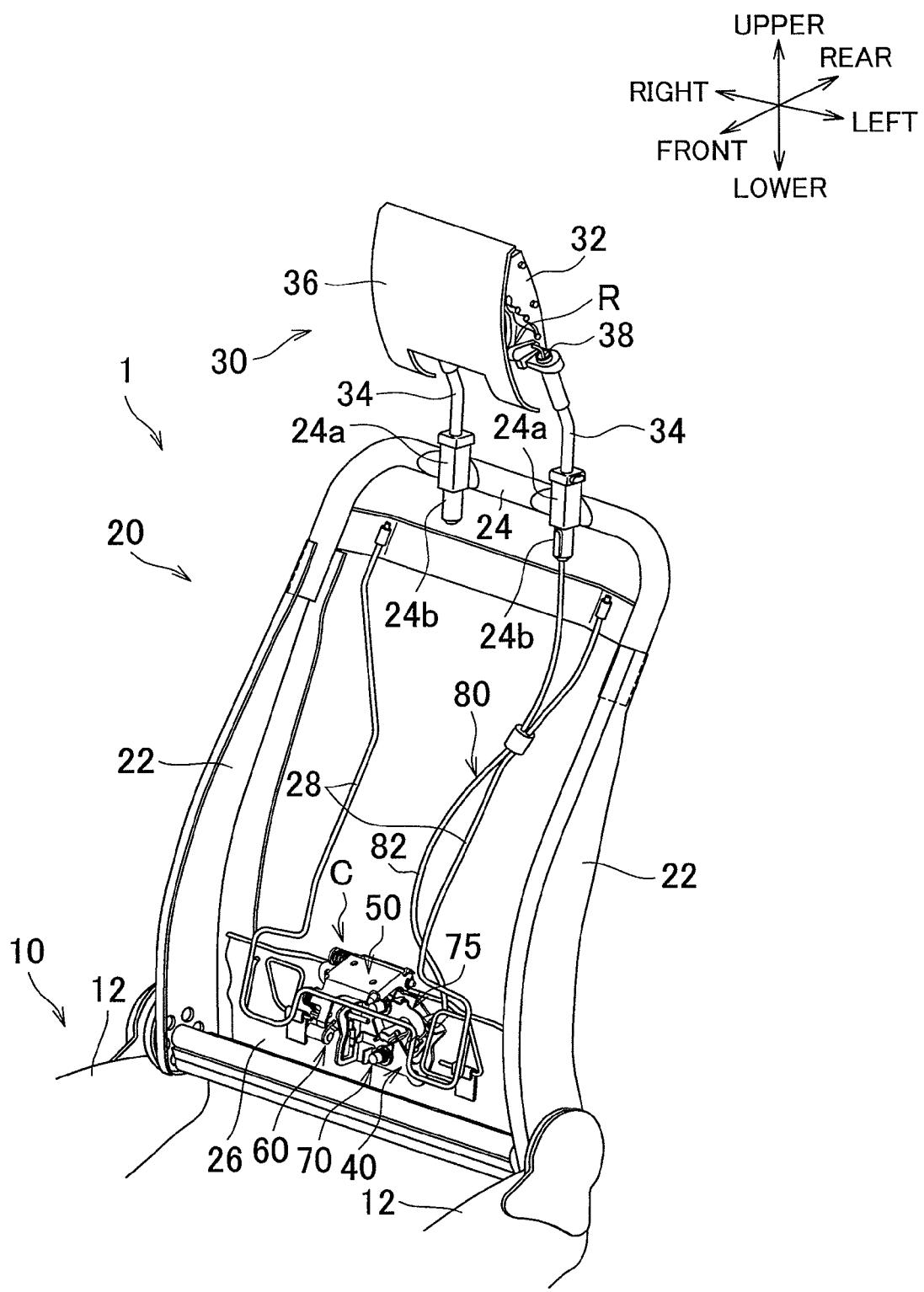
FIG. 1 is an overall schematic view of a vehicle seat to which a clutch mechanism for a vehicle seat is applied according to an embodiment of the invention.
Figure 2:
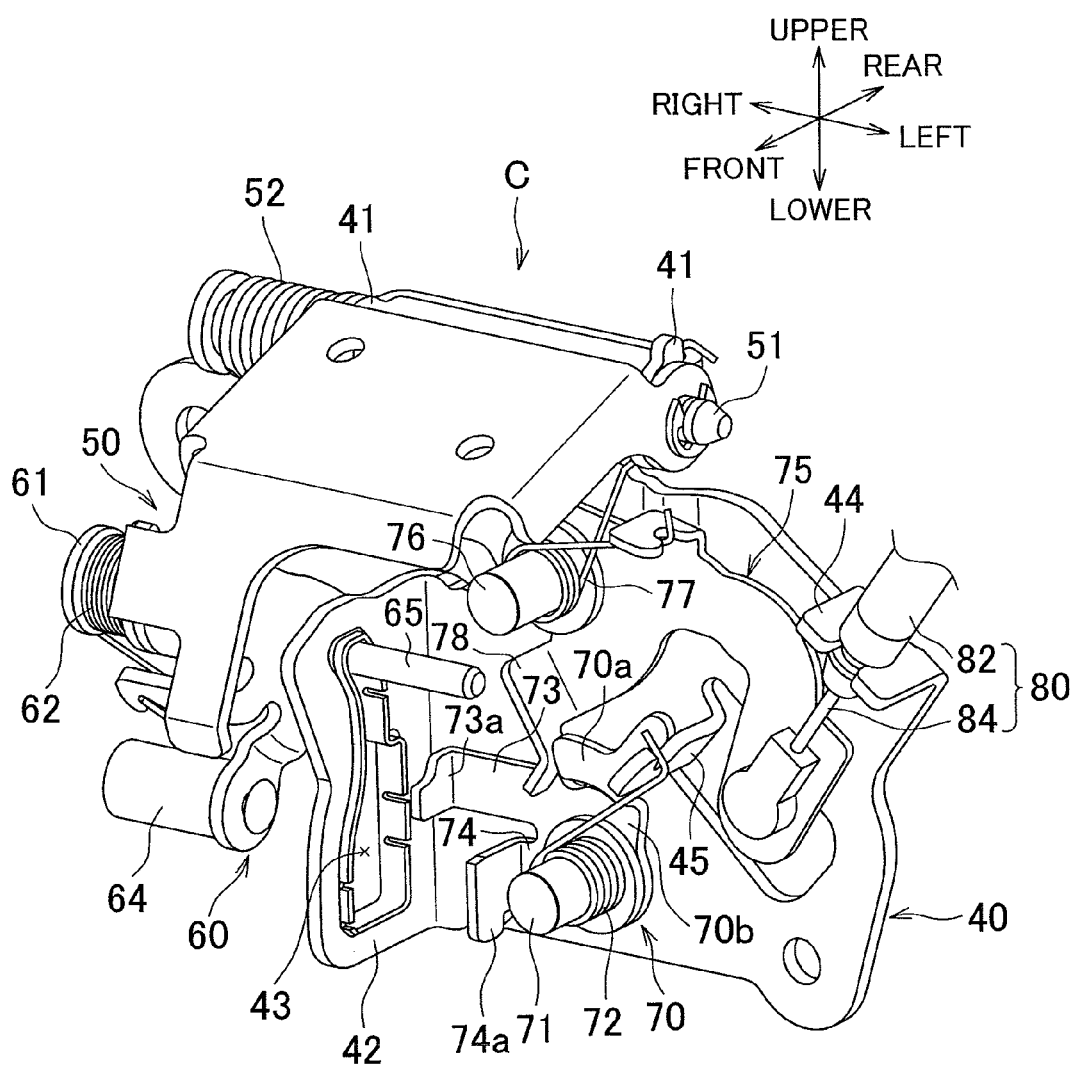
FIG. 2 is an enlarged view of the clutch mechanism for a vehicle seat shown in FIG. 1.
Figure 3:
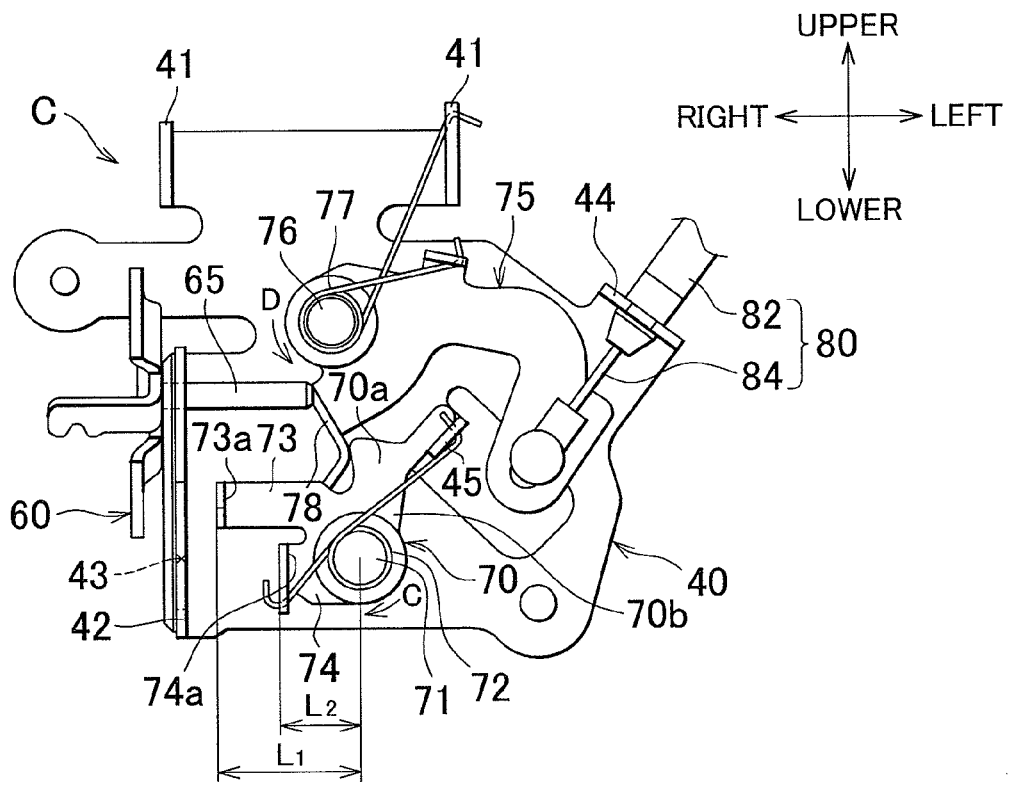
FIG. 3 is a front schematic view of FIG. 2.
Figure 4:
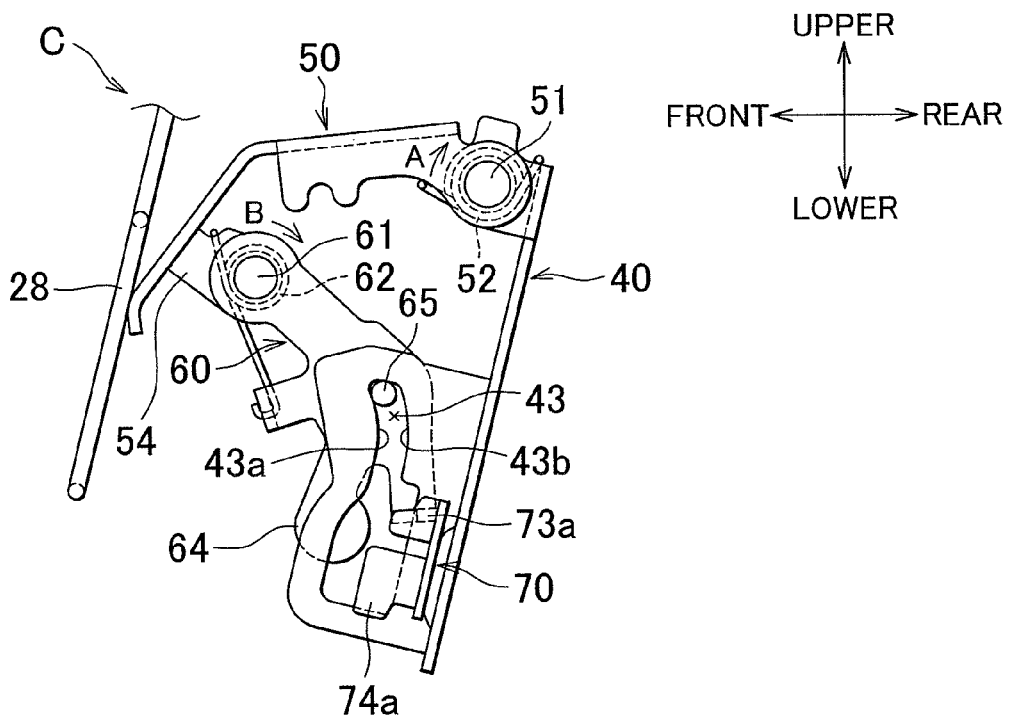
FIG. 4 is a side schematic view of FIG. 2.

Hereinafter, an embodiment of the invention will be described with reference to FIG. 1 to FIG. 14. FIG. 1 is an overall schematic view of a vehicle seat to which a clutch mechanism for a vehicle seat is applied according to the embodiment of the invention. FIG. 2 is an enlarged view of the clutch mechanism for a vehicle seat shown in FIG. 1. FIG. 3 is a front schematic view of FIG. 2. FIG. 4 is a side schematic view of FIG. 2.

Figure 5:
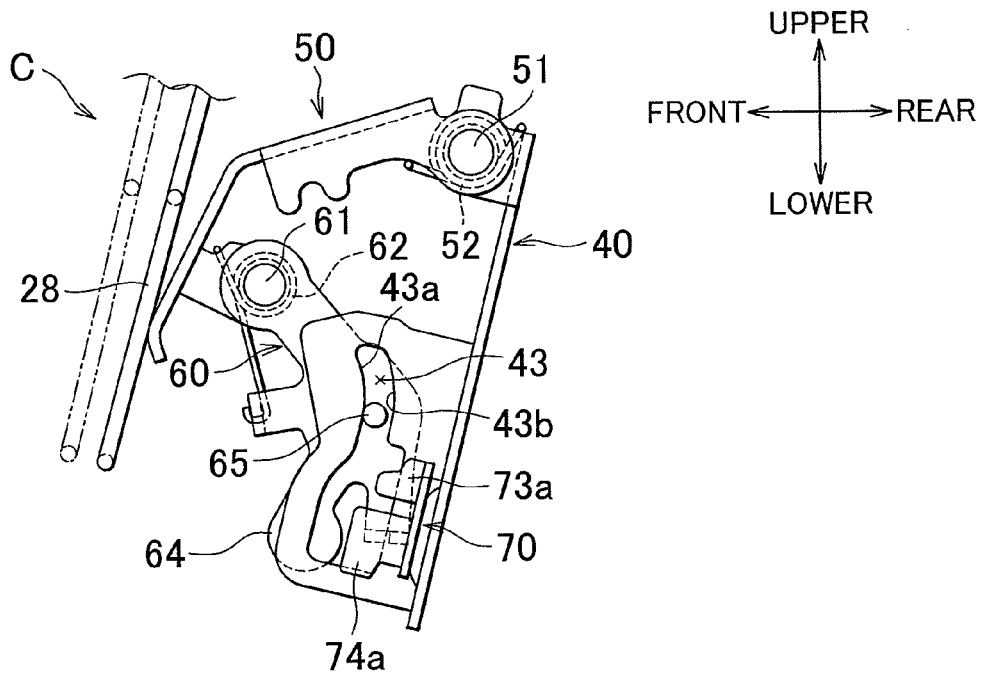
FIG. 5 is a schematic view that shows a state where an occupant's backrest load is applied by mere backrest motion of an occupant having a light weight from the state shown in FIG. 4.
Figure 6:
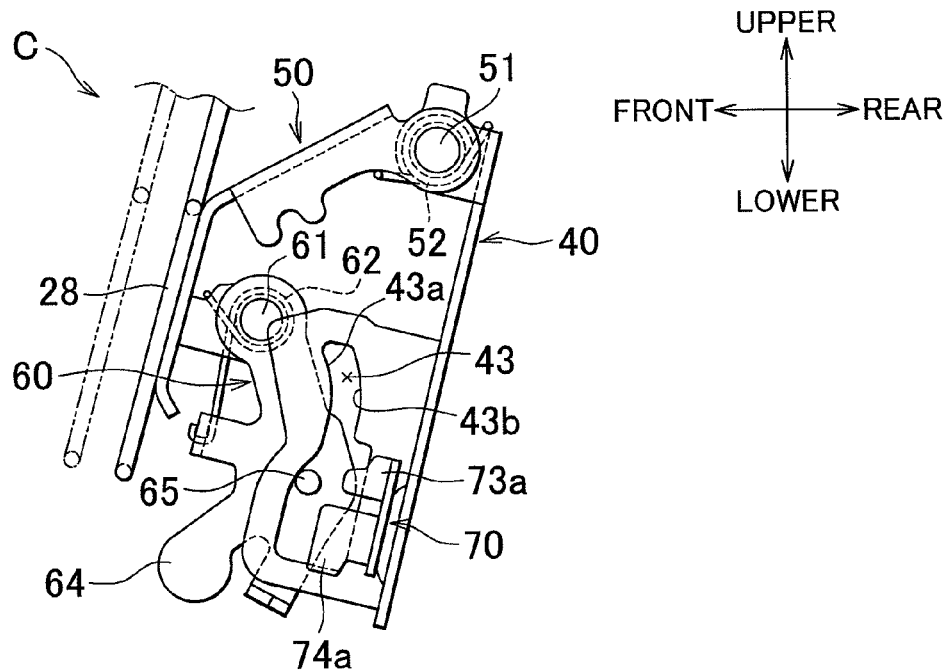
FIG. 6 is a schematic view that shows a state where an occupant's backrest load is strongly applied when the occupant gets on or off the vehicle from the state shown in FIG. 5.
Figure 7:
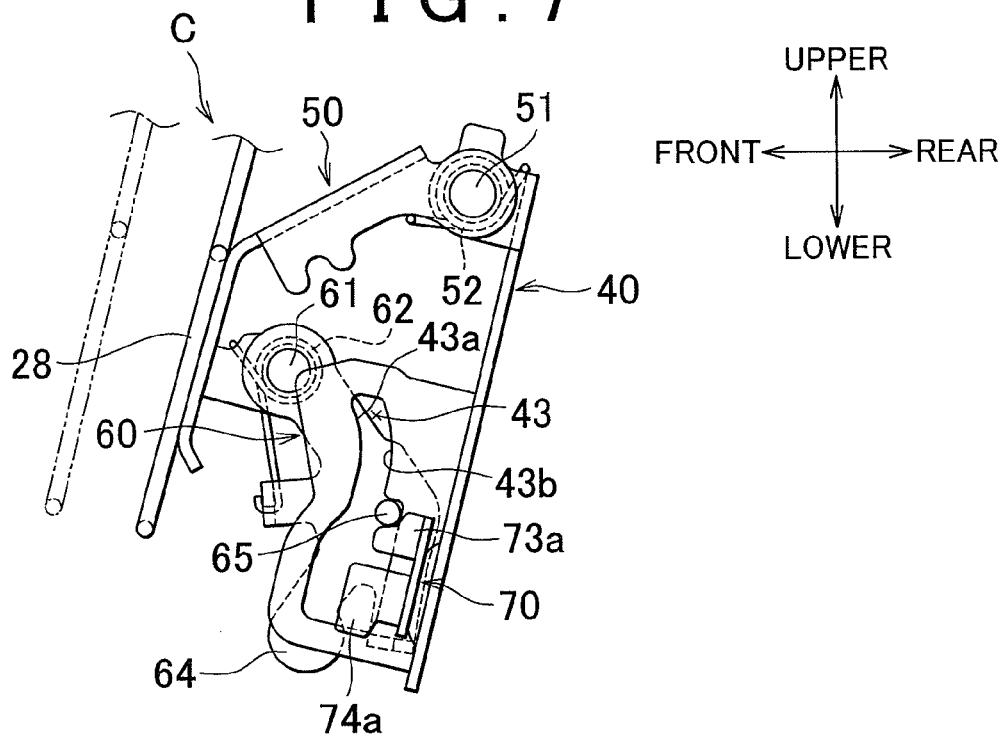
FIG. 7 is a schematic view that shows a state where an occupant's backrest load is strongly applied when a rear-end collision occurs in the vehicle from the state shown in FIG. 5.
Figure 8:
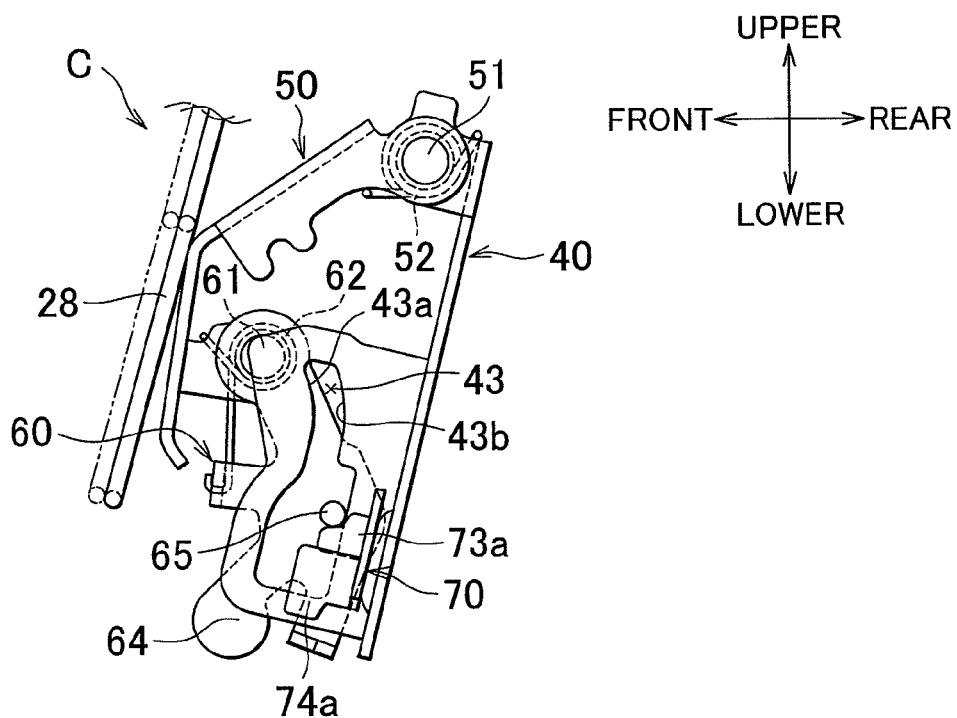
FIG. 8 is a schematic view that shows a state where a backrest load is strongly applied further from the state shown in FIG. 7.
Figure 9:
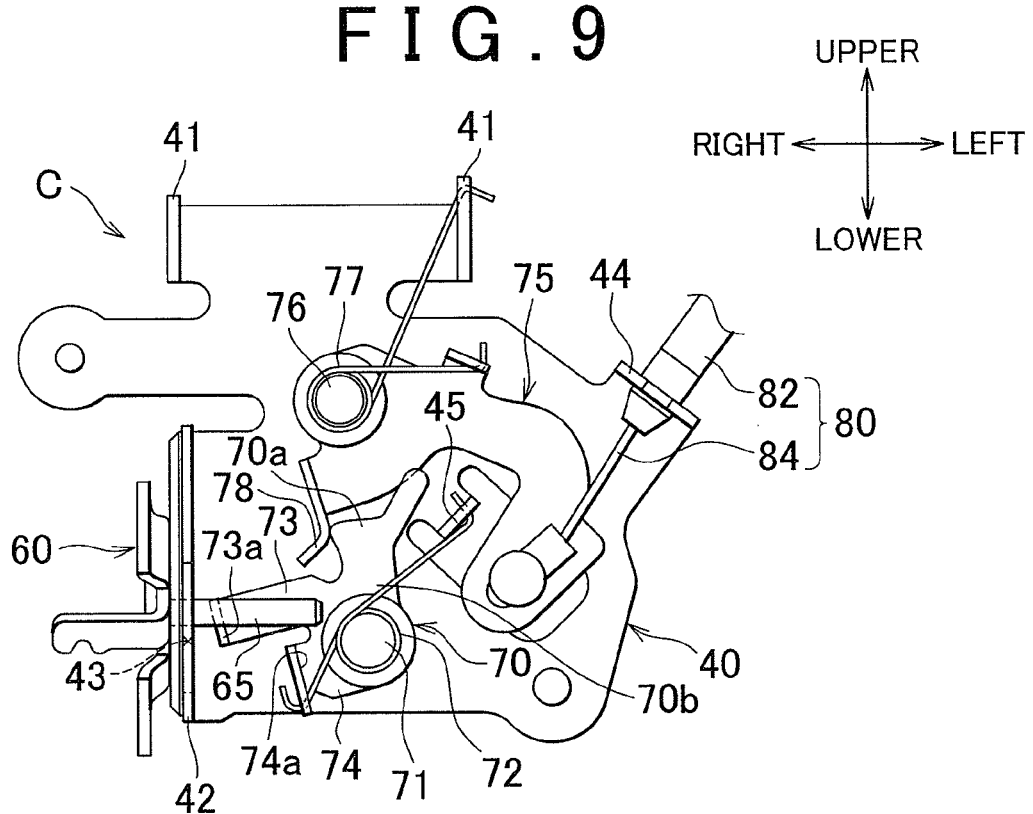
FIG. 9 is a front schematic view of FIG. 8.

FIG. 5 is a schematic view that shows a state where an occupant's backrest load is applied by mere backrest motion of an occupant having a light weight from the state shown in FIG. 4. FIG. 6 is a schematic view that shows a state where an occupant's backrest load is strongly applied when the occupant gets on or off the vehicle from the state shown in FIG. 5. FIG. 7 is a schematic view that shows a state where an occupant's backrest load is strongly applied when a rear-end collision occurs in the vehicle from the state shown in FIG. 5. FIG. 8 is a schematic view that shows a state where a backrest load is strongly applied further from the state shown in FIG. 7. FIG. 9 is a front schematic view of FIG. 8.

Figure 10:
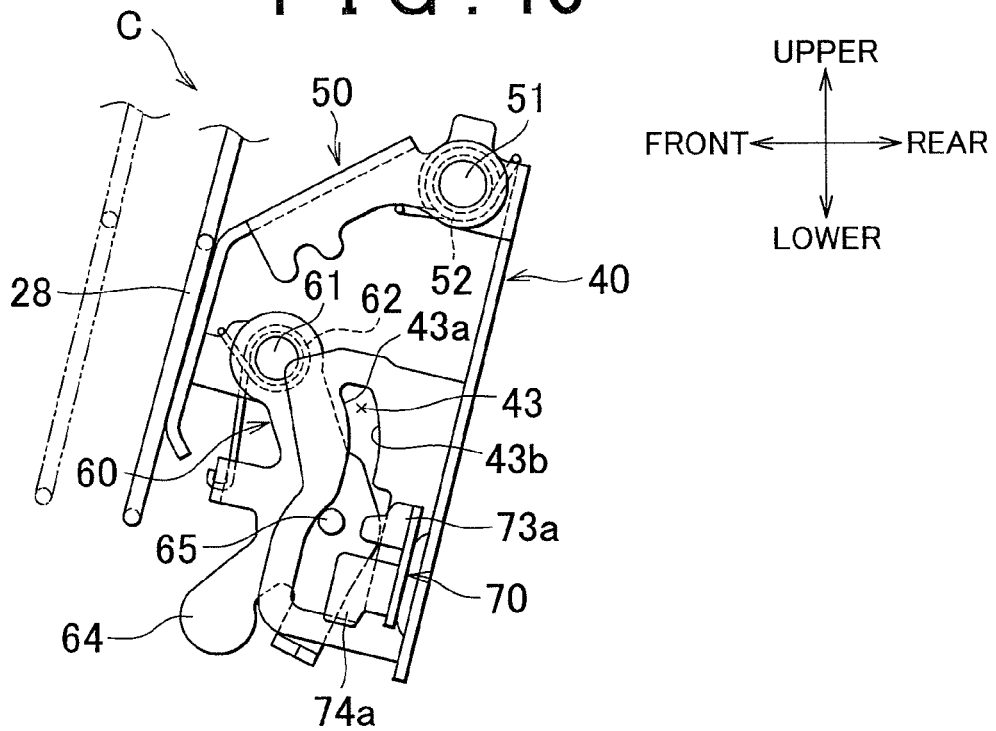
FIG. 10 is a schematic view that shows a state where an occupant's backrest load is applied by mere backrest motion of an occupant having a heavy weight from the state shown in FIG. 4.
Figure 11:
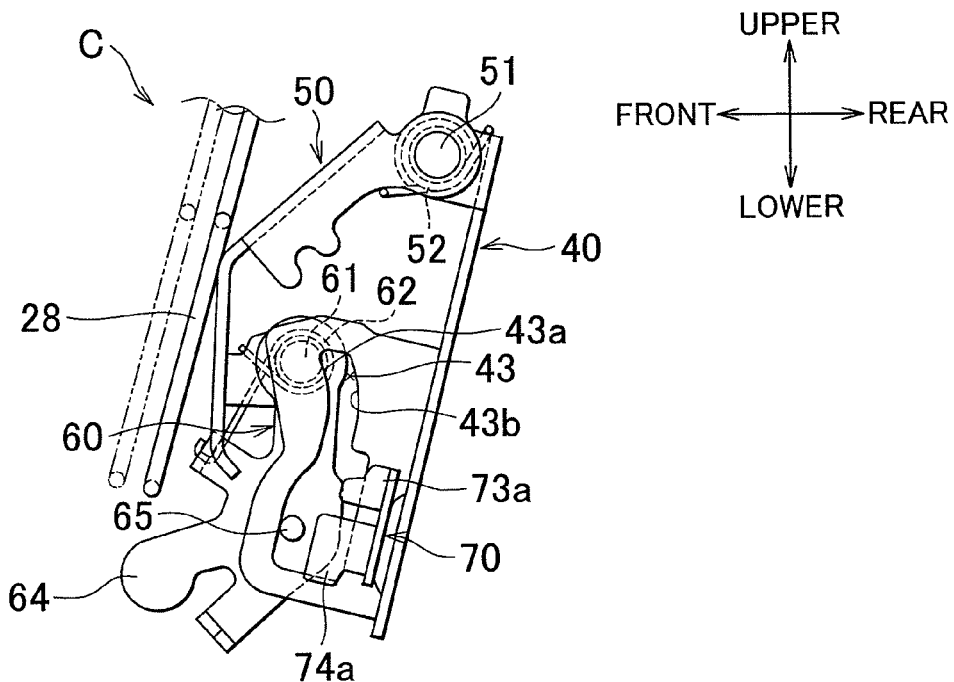
FIG. 11 is a schematic view that shows a state where an occupant's backrest load is strongly applied when the occupant gets on or off the vehicle from the state shown in FIG. 10.
Figure 12:
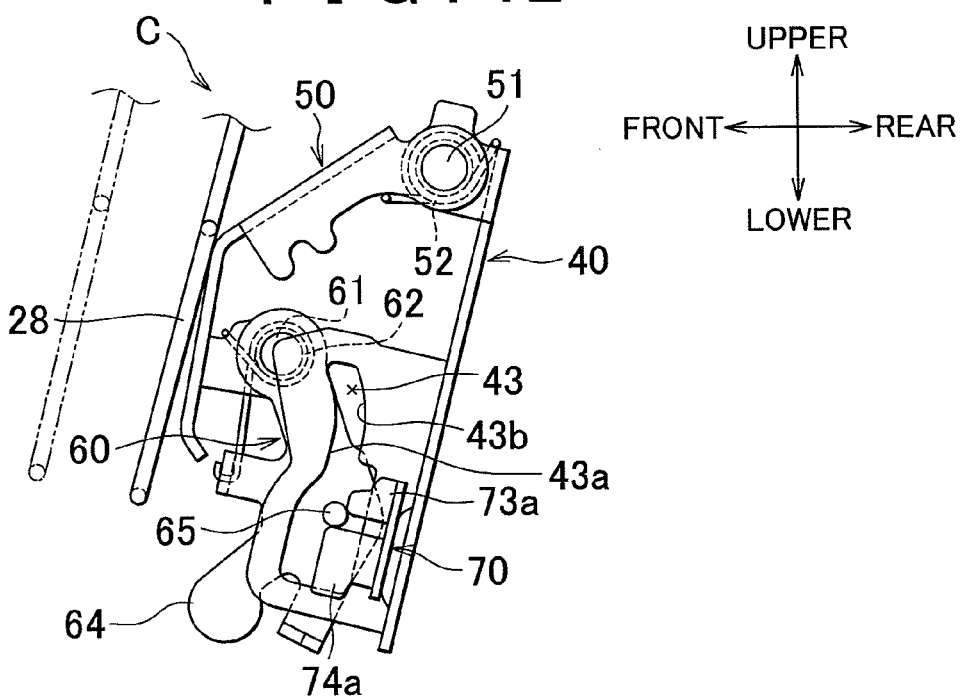
FIG. 12 is a schematic view that shows a state where an occupant's backrest load is strongly applied when a rear-end collision occurs in the vehicle from the state shown in FIG. 10.
Figure 13:
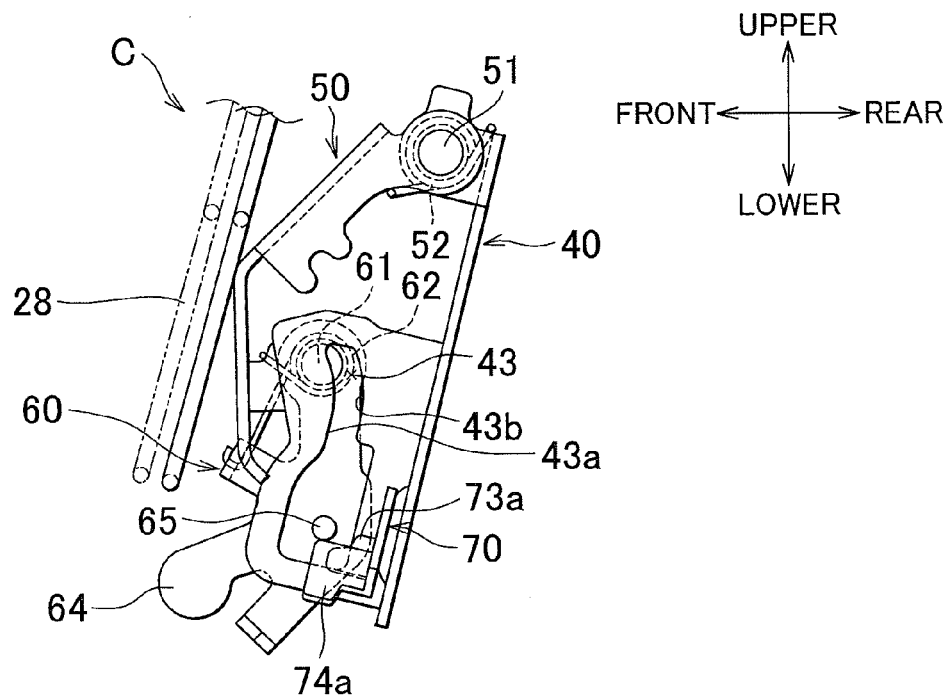
FIG. 13 is a schematic view that shows a state where a backrest load is strongly applied further from the state shown in FIG. 12.
Figure 14:
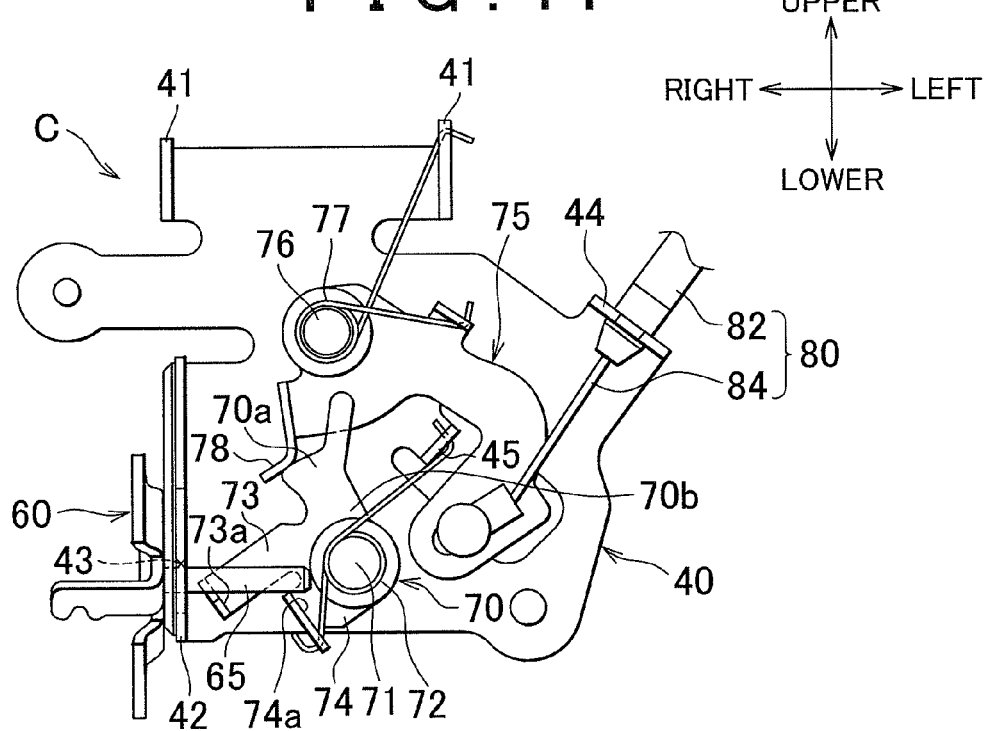
FIG. 14 is a front schematic view of FIG. 13.

FIG. 10 is a schematic view that shows a state where an occupant's backrest load is applied by mere backrest motion of an occupant having a heavy weight from the state shown in FIG. 4. FIG. 11 is a schematic view that shows a state where an occupant's backrest load is strongly applied when the occupant gets on or off the vehicle from the state shown in FIG. 10. FIG. 12 is a schematic view that shows a state where an occupant's backrest load is strongly applied when a rear-end collision occurs in the vehicle from the state shown in FIG. 10. FIG. 13 is a schematic view that shows a state where a backrest load is strongly applied further from the state shown in FIG. 12. FIG. 14 is a front schematic view of FIG. 13.

Note that, in order to clearly illustrate the internal structure of a vehicle seat 1 formed of a seat cushion 10, a seat back 20 and an active headrest 30, FIG. 1 omits the cushion structure and cover structure of these and shows the frame structure inside the vehicle seat 1 only. In addition, in the following description, upper, lower, front, rear, left and right respectively indicate the upper, lower, front, rear, left and right directions illustrated in the drawings, that is, the upper, lower, front, rear, left and right directions with reference to the vehicle seat 1.

First, the overall configuration of the vehicle seat 1 according to the embodiment of the invention will be described. As shown in FIG. 1 and FIG. 2, the vehicle seat 1 includes the seat cushion 10, the seat back 20 and the active headrest 30. An occupant is seated on the seat cushion 10. The seat back 20 serves as a backrest for the seated occupant. The active headrest 30 supports the back of the head of the seated occupant.

Among these components, the respective frame structures of the seat back 20 and active headrest 30 will be described in detail. Note that the seat cushion 10 has a known configuration, so the detailed description thereof is omitted. First, the frame structure of the seat back 20 will be described in detail. The frame of the seat back 20 includes a pair of left and right side frames 22, an upper frame 24 and a lower frame 26. The upper frame 24 bridges the upper portions of both side frames 22. The lower frame 26 bridges the lower portions of both side frames 22.

The lower ends of both side frames 22 are assembled respectively to the rear ends of a pair of left and right cushion frames 12 of the seat cushion 10 via reclining mechanisms (not shown). Thus, the seat back 20 may be tilted with respect to the seat cushion 10, and the seat back 20 may be held at a desired position within the range in which the seat back 20 may be tilted.

A pair of left and right holders 24a are assembled to the upper frame 24. Supports 24b are respectively assembled to both holders 24a. A pair of left and right stays 34 of the active headrest 30, which will be described later, may be inserted into and engaged with the supports 24b. By so doing, the active headrest 30 may be assembled to the seat back 20.

Note that a lock release member (not shown) for releasing a lock mechanism R of the active headrest 30, which will be described later, is provided inside one of the supports 24b (the left support 24b in FIG. 1). The lock release member is connected to a second swing member 75, which will be described later, via an operation cable 80. The operation cable 80 is a double-structure cable member formed of a cylindrical outer cable 82 and a wire-shaped inner cable 84. The inner cable 84 is movably inserted in the outer cable 82.

Within the operation cable 80, one end (upper end) of the outer cable 82 is hooked on the left support 24b, while the other end (lower end) is hooked on a third rib 44 of a base plate 40, which will be described later. On the other hand, one end (upper end) of the inner cable 84 is hooked on the above described lock release member, while the other end (lower end) thereof is hooked on the second swing member 75, which will be described later. Then, as the tension is applied to the inner cable 84, the lock release member moves a rod 38 inside the left stay 34 to release the lock mechanism R of the active headrest 30. Note that the operation cable 80 functions as a "transmitting member" according to the aspect of the invention. In this way, the frame of the seat back 20 is formed.

Next, the frame structure of the active headrest 30 will be described in detail. The frame of the active headrest 30 includes a base portion 32, a pair of left and right stays 34, and a support plate 36. The base portion 32 contours the active headrest 30. The pair of left and right stays 34 are integrally assembled to the base portion 32. The support plate 36 is assembled to the base portion 32 via an extension spring and a link mechanism (both are not shown in the drawing).

Note that, during normal times before a rear-end collision occurs in the vehicle, the support plate 36 is locked by the lock mechanism R so as to be substantially integrated with the base portion 32 against the urging force of the extension spring. Therefore, as the above described lock mechanism R is released, the link mechanism is activated by the urging force of the extension spring to cause the support plate 36 to instantaneously pop up forward with respect to the base portion 32. By so doing, it is possible to instantaneously support the back of the head of the occupant by the support plate 36. In this way, the frame of the active headrest 30 is formed.

Next, a clutch mechanism C assembled to the above described vehicle seat 1 will be described. As shown in FIG. 2 to FIG. 4, the clutch mechanism C includes the base plate 40, a pressure receiving member 50, a coupling arm 60, a first swing member 70 and the second swing member 75. Hereinafter, these components 40, 50, 60, 70 and 75 will be separately described.

First, the base plate 40 will be described. The base plate 40 is a shape that serves as a base of the clutch mechanism C. The base plate 40 is fastened to the front face of the lower frame 26 (not shown in FIG. 2 to FIG. 4).

Next, the pressure receiving member 50 will be described. The pressure receiving member 50 is a plate that receives a backrest load of the occupant seated on the vehicle seat 1. The pressure receiving member 50 is assembled to a pair of left and right first ribs 41 via a pin 51 so that the pressure receiving member 50 is pivotable about an axis of which the direction coincides with a vehicle width direction. The pair of left and right first ribs 41 are formed on the base plate 40. At this time, the pressure receiving member 50 is assembled so that the distal end of the pressure receiving member 50 is urged via a torsion spring 52 in a direction (arrow A direction in FIG. 4) to contact a bending spring 28 that supports a pad (not shown).

Next, the coupling arm 60 will be described. The coupling arm 60 is formed into a substantially dogleg shape. The coupling arm 60 transmits only an occupant's backrest load, caused by a rear-end collision of the vehicle, to the first swing member 70, which will be described later. A pin 65 is formed at a bent portion of a substantially dogleg shape of the coupling arm 60. The pin 65 is movable inside an oblong hole 43 formed in a second rib 42 of the base plate 40. In addition, a weight 64 is assembled to the distal end of the coupling arm 60.

A rib 54 is formed on the pressure receiving member 50. Then, the coupling arm 60 is assembled to the rib 54 via a pin 61 so that the proximal end of the coupling arm 60 is pivotable about an axis of which the direction coincides with the vehicle width direction. At this time, the coupling arm 60 is assembled so that the pin 65 thereof is urged via a torsion spring 62 in a direction (arrow B direction in FIG. 4) to contact a front face 43a of the oblong hole 43.

Subsequently, the first swing member 70 will be described. The first swing member 70 is a flat member with portions bent substantially at a right angle. The first swing member 70 transmits a backrest load from the above described coupling arm 60 to the second swing member 75, which will be described later. The first swing member 70 is assembled to the base plate 40 via a pin 71 so that the first swing member 70 is pivotable about an axis of which the direction coincides with a direction perpendicular to the surface of the base plate 40. At this time, the first swing member 70 is assembled so that a protruding portion 70a is urged via a torsion spring 72 in a direction (arrow C direction in FIG. 3) to contact a fourth rib 45. The protruding portion 70a is formed to protrude from part of a main body 70b of the first swing member 70. The fourth rib 45 is formed on the base plate 40.

In addition, a first arm 73 and a second arm 74 are formed on the main body 70b of the first swing member 70. The first arm 73 and the second arm 74 protrude from part of the main body 70b of the first swing member 70. Hooks 73a and 74a are respectively formed at the distal ends of these arms 73 and 74. Between these hooks 73a and 74a, the former hook 73a is formed so that the pin 65 of the coupling arm 60 is pressed against the hook 73a by a small backrest load, while the latter hook 74a is formed so that the pin 65 of the coupling arm 60 is pressed against the hook 74a by a large backrest load.

Then, a distance L1 (hereinafter, simply referred to as "effective length of the first arm 73") in a seat width direction between the hook 73a of the first arm 73 and the rotation center of the first swing member 70 is longer than a distance L2 (hereinafter, simply referred to as "effective length of the second arm 74") in the seat width direction between the hook 74a, formed at the distal end of the second arm 74, and the rotation center of the first swing member 70 (see FIG. 3).

Note that the above described effective length of the first arm 73 is set at a length such that, as the pin 65 of the coupling arm 60 presses the first arm 73, the second swing member 75, which will be described later, is pivoted to make it possible to apply sufficient tension to the inner cable 84. This also applies to the effective length of the second arm 74. In addition, the first swing member 70 serves as a "swing member" according to the aspect of the invention.

Lastly, the second swing member 75 will be described. The second swing member 75 is a flat member with portions bent substantially at a right angle. The second swing member 75 pulls the operation cable 80 by a backrest load transmitted from the above described first swing member 70. The second swing member 75, as in the case of the first swing member 70, is assembled to the base plate 40 via a pin 76 so that the second swing member 75 is pivotable about an axis of which the direction coincides with a direction perpendicular to the base plate 40. At this time, the second swing member 75 is assembled so that a rib 78 is urged via a torsion spring 77 in a direction (arrow D direction in FIG. 3) to contact the protruding portion 70a of the first swing member 70. The rib 78 is formed on the outer peripheral surface of second swing member 75. In addition, as described above, the other end (lower end) of the inner cable 84 of the operation cable 80 is hooked on the second swing member 75. In this way, the clutch mechanism C is formed.

Next, the operation of the above described clutch mechanism C will be described with reference to FIG. 4 to FIG. 14. The description will be made separately when a light occupant is seated on the vehicle seat 1 (when a small backrest load is applied) and when a heavy occupant is seated on the vehicle seat 1 (when a large backrest load is applied).

First, the case where a light occupant is seated on the vehicle seat 1 will be described. As the occupant merely rests on the seat back 20 from the state shown in FIG. 4 and then the pressure receiving member 50 receives a backrest load from the occupant (as the pressure receiving member 50 becomes the state shown in FIG. 5), the pin 65 of the coupling arm 60 moves downward inside the oblong hole 43.

In addition, as the occupant gets off the vehicle and then the pressure receiving member 50 further receives a backrest load from the occupant from the state shown in FIG. 5 (as the pressure receiving member 50 becomes the state shown in FIG. 6), the pin 65 of the coupling arm 60 moves further downward along the front face 43a inside the oblong hole 43. Therefore, neither the backrest load caused by the occupant merely resting nor the backrest load caused by the occupant getting off the vehicle is transmitted to the first swing member 70. Note that this also applies to a backrest load caused by the occupant getting on the vehicle.

Subsequently, as a rear-end collision occurs in the vehicle from the state shown in FIG. 5 and then the pressure receiving member 50 further receives a backrest load from the occupant, the pin 65 of the coupling arm 60 moves downward inside the oblong hole 43. At this time, inertial force is applied to the weight 64 of the coupling arm 60 rearward because of the rear-end collision of the vehicle, so the pin 65 of the coupling arm 60 moves along a rear face 43b inside the oblong hole 43 against the urging force of the torsion spring 62 applied to the coupling arm 60 (see FIG. 7).

Then, the pin 65 of the coupling arm 60 moves while pressing the hook 73a of the first arm 73 of the first swing member 70. This movement of the pin 65 causes the pin 65 of the coupling arm 60 to progressively pivot the first swing member 70 against the urging force of the torsion spring 72. Thus, the backrest load caused by the rear-end collision of the vehicle is transmitted to the first swing member 70 (see FIG. 8).

At this time, the protruding portion 70a of the first swing member 70 presses the rib 78 of the second swing member 75. As the protruding portion 70a presses the rib 78, the second swing member 75 also progressively pivots against the urging force of the torsion spring 77 (see FIG. 9). Then, the inner cable 84 of the operation cable 80 is pulled, and the tension is applied to the pulled inner cable 84. Therefore, as described above, the lock mechanism R is released to cause the support plate 36 to pop up toward the back of the head of the occupant. In this way, even when the light occupant is seated on the vehicle seat 1, it is possible to cause the active headrest 30 to pop up toward the back of the head of the occupant.

Subsequently, the case where the heavy occupant is seated on the vehicle seat 1 will be described. As the occupant merely rests on the seat back 20 from the state shown in FIG. 4 and then the pressure receiving member 50 receives a backrest load from the occupant (as the pressure receiving member 50 becomes the state shown in FIG. 10), the coupling arm 60 is pivoted so that the pin 65 of the coupling arm 60 moves downward inside the oblong hole 43, as in the case of the description as to when the light occupant is seated on the vehicle seat 1.

In addition, as the occupant gets off the vehicle and then the pressure receiving member 50 further receives a backrest load from the occupant from the state shown in FIG. 10 (as the pressure receiving member 50 becomes the state shown in FIG. 11), the pin 65 of the coupling arm 60 moves further downward along the front face 43a inside the oblong hole 43. Therefore, neither the backrest load caused by the occupant merely resting nor the backrest load caused by the occupant getting off the vehicle is transmitted to the first swing member 70. Note that this also applies to a backrest load caused by the occupant getting on the vehicle.

Subsequently, as a rear-end collision occurs in the vehicle from the state shown in FIG. 10 and then the pressure receiving member 50 further receives a backrest load from the occupant, the pin 65 of the coupling arm 60 moves downward inside the oblong hole 43, as in the case of the description as to when the light occupant is seated on the vehicle seat 1. At this time, inertial force is applied to the weight 64 of the coupling arm 60 rearward because of the rear-end collision of the vehicle, so the pin 65 of the coupling arm 60 moves along a rear face 43b inside the oblong hole 43 against the urging force of the torsion spring 62 applied to the coupling arm 60 (see FIG. 12).

Then, the pin 65 of the coupling arm 60 moves while pressing the hook 74a of the second arm 74 of the first swing member 70. This movement of the pin 65 causes the pin 65 of the coupling arm 60 to progressively pivot the first swing member 70 against the urging force of the torsion spring 72. Thus, the backrest load caused by the rear-end collision of the vehicle is transmitted to the first swing member 70 (see FIG. 13).

At this time, the protruding portion 70a of the first swing member 70 presses the rib 78 of the second swing member 75. As the protruding portion 70a presses the rib 78, the second swing member 75 also progressively pivots against the urging force of the torsion spring 77 (see FIG. 14). Then, the inner cable 84 of the operation cable 80 is pulled, and the tension is applied to the pulled inner cable 84. Therefore, as described above, the lock mechanism R is released to cause the support plate 36 to pop up toward the back of the head of the occupant. In this way, even when the heavy occupant is seated on the vehicle seat 1, it is possible to cause the active headrest 30 to pop up toward the back of the head of the occupant, as in the case of the description as to when the light occupant is seated on the vehicle seat 1.

The clutch mechanism C for a vehicle seat according to the embodiment of the invention is configured as described above. With the above configuration, even when a light occupant is seated on the vehicle seat 1 or even when a heavy occupant is seated on the vehicle seat 1, it is possible to transmit only an occupant's backrest load, caused by a rear-end collision of the vehicle, to the first swing member 70. Therefore, even when there is a physique difference among occupants, it is possible to reliably transmit only an occupant's backrest load, caused by a rear-end collision of the vehicle, to the first swing member 70. In addition, with the above configuration, the effective length of the first arm 73 is longer than the effective length of the second arm 74. Therefore, even when the backrest load is small, the first swing member 70 may be pivoted. Thus, even when an occupant is light, it is possible to reliably cause the active headrest 30 to pop up toward the back of the head of the occupant.

In addition, with the above configuration, the second swing member 75 is pivoted by the backrest load transmitted to the first swing member 70, and the pivot is utilized to apply the tension to the operation cable 80, thus releasing the lock mechanism R. Therefore, it is possible to release the lock mechanism R using the pivot of the first swing member 70.

In addition, with the above configuration, it is possible to cause the support plate 36 to pop up toward the back of the head of an occupant by an occupant's backrest load caused by a rear-end collision of the vehicle. Thus, as a rear-end collision occurs in the vehicle, it is possible to instantaneously receive the back of the head of the occupant by the support plate 36.

The above described content only relates to one embodiment of the invention, and is not intended to limit the invention. In the embodiment, the clutch mechanism C includes the base plate 40, the pressure receiving member 50, the coupling arm 60, the first swing member 70 and the second swing member 75. However, the aspect of the invention is not limited to the above embodiment. The clutch mechanism C may include the base plate 40, the pressure receiving member 50, the coupling arm 60 and the first swing member 70. That is, the clutch mechanism C may be configured without the second swing member 75. In this case, it is only necessary that the other end (lower end) of the inner cable 84 is hooked on the first swing member 70.

In addition, in the above embodiment, the first arm 73 corresponding to a small backrest load and the second arm 74 corresponding to a large backrest load are described as an example of a plurality of arms that are formed to operate on the basis of the magnitude of an occupant's backrest load. However, the aspect of the invention is not limited to this configuration. A third arm corresponding to an intermediate backrest load may be further provided.

In the above embodiment, a difference in height between the first arm 73 and the second arm 74 is small, so the distances L1 and L2 in the seat width direction are respectively employed as the effective lengths of the first and second arms. However, distances from the distal ends of the first and second arms to the rotation center of the swing member 70 may be respectively employed as the effective lengths of the first and second arms.

What is claimed is:

1. A clutch mechanism for a vehicle seat, comprising:
   a pressure receiving member that is pivotably connected to a frame of a seat back;
   a coupling arm that is pivotably connected to the pressure receiving member, wherein the coupling arm is provided with a weight and receives an occupant's backrest load via the pressure receiving member, and the occupant's backrest load received and inertia force applied to the weight in the event of a rear-end collision of the vehicle cause the coupling arm to move in the event of a rear-end collision of a vehicle; and
   a swing member that is pivotably connected to the frame of the seat back and that is pressed by the coupling arm to pivot, wherein
   the swing member has a first arm receiving a first backrest load via the coupling arm and a second arm receiving a second backrest load, which is larger than the first backrest load, via the coupling arm,
   a distance between a point at which the first arm is pressed by the coupling arm and a rotation center of the swing member is longer than a distance between a point at which the second arm is pressed by the coupling arm and the rotation center of the swing member.

2. The clutch mechanism for a vehicle seat according to claim 1, wherein
   the coupling arm is provided with a rod that extends toward the swing member, and
   when the pressure receiving member pivots, the rod presses a first hook formed on the first arm or a second hook formed on the second arm to swing the swing member, whereby an occupant's backrest load is transmitted to the swing member.

3. The clutch mechanism for a vehicle seat according to claim 2, further comprising:
   a guide plate that has a guide hole along which the rod moves substantially downward when the pressure receiving member receives the occupant's backrest load, wherein
   the rod extends from the coupling arm in a seat width direction of the vehicle seat,
   the first arm extends from the swing member toward the coupling arm in the seat width direction and has the first hook at its distal end, wherein the first hook extends toward a front of the vehicle seat,
   the second arm extends from the swing member toward the coupling arm in the seat width direction and has the second hook at its distal end, wherein the second hook extends toward the front of the vehicle seat,
   the first arm is provided above the second arm, and
   in the event of the rear-end collision, the rod presses the first hook or the second hook downward.

4. The clutch mechanism for a vehicle seat according to claim 2, further comprising:
   a guide plate that has a guide hole along which the rod moves substantially downward when the pressure receiving member receives the occupant's backrest load, wherein
   the guide hole has a front end of the guide hole that is formed forward of the first hook and the second hook in side view,
   the rod is urged toward the front of the vehicle seat in the guide hole,
   when inertial force is applied to the weight in the event of a rear-end collision of the vehicle, the rod is distanced from the front end of the guide hole,
   a distance between the front end of the guide hole and a front end of the first hook is larger than a thickness of the rod in a longitudinal direction of the vehicle seat,
   a distance between the front end of the guide hole and a front end of the second hook is larger than the thickness of the rod in the longitudinal direction of the vehicle seat, and
   the front end of the second hook is formed forward of the front end of the first hook.

5. The clutch mechanism for a vehicle seat according to claim 1, wherein a distance in a seat width direction between the point at which the first arm is pressed by the coupling arm and the rotation center of the swing member is longer than a distance in the seat width direction between the point at which the second arm is pressed by the coupling arm and the rotation center of the swing member.

6. The clutch mechanism for a vehicle seat according to claim 1, further comprising:
   a lock mechanism that is provided for the seat back and that is connected to the swing member via a transmitting member, wherein
   the lock mechanism is released as the swing member pivots.

7. The clutch mechanism for a vehicle seat according to claim 6, further comprising:
   an active headrest that is assembled to the seat back and that has a support plate that pops up toward the back of a head of the occupant, wherein
   the support plate pops up toward the back of the head of the occupant as the lock mechanism is released.

* * * * *